(12) United States Patent
Genzer

(10) Patent No.: US 11,891,284 B2
(45) Date of Patent: Feb. 6, 2024

(54) CAMERA SAFETY SYSTEM FOR AERIAL DEVICE

(71) Applicant: The Heil Co., Chattanooga, TN (US)

(72) Inventor: Kelly Lee Genzer, Katy, TX (US)

(73) Assignee: The Heil Co., Chattanooga, TN (US)

( * ) Notice: Subject to any disclaimer, the term of this patent is extended or adjusted under 35 U.S.C. 154(b) by 627 days.

(21) Appl. No.: 16/368,126

(22) Filed: Mar. 28, 2019

(65) Prior Publication Data

US 2019/0300351 A1 Oct. 3, 2019

Related U.S. Application Data

(60) Provisional application No. 62/649,005, filed on Mar. 28, 2018.

(51) Int. Cl.
| | | |
|---|---|---|
| *B66F 17/00* | (2006.01) | |
| *B66F 13/00* | (2006.01) | |
| *B66F 11/04* | (2006.01) | |
| *H04N 23/54* | (2023.01) | |
| *H04N 23/90* | (2023.01) | |

(52) U.S. Cl.
CPC .......... *B66F 17/006* (2013.01); *B66F 11/044* (2013.01); *B66F 13/00* (2013.01); *H04N 23/54* (2023.01); *H04N 23/90* (2023.01)

(58) Field of Classification Search
CPC ...... H04N 5/247; H04N 5/225; H04N 5/2253; H04N 5/2251; H04N 5/2257; H04N 23/54; H04N 23/90; B66F 11/048; B66F 17/006; B66F 11/044; B66F 13/00; G03B 29/00
USPC .................................................... 348/211.14
See application file for complete search history.

(56) References Cited

U.S. PATENT DOCUMENTS

| | | | | |
|---|---|---|---|---|
| 2,472,944 A | * | 6/1949 | Furer ..................... | B66F 11/048 280/43.23 |
| 4,281,342 A | * | 7/1981 | Ueda ..................... | G01S 3/7864 356/426 |
| 4,456,093 A | * | 6/1984 | Finley .................... | B66F 11/046 182/2.11 |
| 5,067,013 A | * | 11/1991 | Lindholm ............... | B66C 13/46 294/81.4 |

(Continued)

OTHER PUBLICATIONS

Movingongps.com [online], "GPS Fleet Tracking and DVR Surveillance in New York," available on or before Jul. 29, 2018, via Internet Archive: Wayback Machine URL <http://web.archive.org/web/20180729184550/http://www.movinongps.com/>, retrieved on Sep. 25, 2023, URL <www.movingongps.com>, 4 pages.

(Continued)

*Primary Examiner* — Daniel P Cahn
*Assistant Examiner* — Shiref M Mekhaeil
(74) *Attorney, Agent, or Firm* — Fish & Richardson P.C.

(57) ABSTRACT

An aerial device data collection apparatus is described. The aerial data collection apparatus includes a power source, a data capture device, a wireless transmitter, and a housing. The data capture device is connected to the power source. The wireless transmitter is connected to the power source and is communicably coupled to the data capture device. The wireless transmitter is configured to transmit data captured by the data capture device. The power source and the wireless transmitter are contained within the housing. The housing is configured to couple to a surface of an aerial bucket.

17 Claims, 4 Drawing Sheets

(56) References Cited

U.S. PATENT DOCUMENTS

| | | | | |
|---|---|---|---|---|
| 5,089,972 | A * | 2/1992 | Nachman | B66C 13/48 700/218 |
| 6,297,744 | B1 * | 10/2001 | Baillargeon | B66F 17/006 340/685 |
| 6,496,766 | B1 * | 12/2002 | Bernold | B66C 15/065 340/685 |
| 6,549,139 | B2 * | 4/2003 | Shaw, Jr. | B66C 13/46 340/685 |
| 6,718,661 | B1 * | 4/2004 | Miller | E02F 3/962 37/395 |
| 6,744,372 | B1 * | 6/2004 | Shaw | B66C 15/06 340/685 |
| 6,820,980 | B1 * | 11/2004 | Romanoff | F16M 11/18 396/428 |
| 6,894,621 | B2 * | 5/2005 | Shaw | B66C 13/54 340/685 |
| 6,985,085 | B1 * | 1/2006 | Brown | B66C 15/065 340/685 |
| 7,086,435 | B1 * | 8/2006 | Coulbourn, Jr. | A01G 23/08 144/34.1 |
| 7,252,441 | B2 * | 8/2007 | Chapman | F16M 11/42 396/428 |
| 7,697,035 | B1 * | 4/2010 | Suber, III | H04N 23/698 348/211.8 |
| 8,033,742 | B1 * | 10/2011 | Chapman | F16M 11/18 396/428 |
| 8,224,518 | B2 * | 7/2012 | Cameron | B66C 13/18 701/50 |
| 8,333,520 | B1 * | 12/2012 | Cronin | B66F 11/048 396/428 |
| 8,405,721 | B2 * | 3/2013 | Bilandi | H04N 7/183 348/143 |
| 8,514,058 | B2 * | 8/2013 | Cameron | B66C 13/16 340/568.1 |
| 8,843,279 | B2 * | 9/2014 | Tafazoli Bilandi | E02F 9/264 701/50 |
| 9,030,332 | B2 * | 5/2015 | Tafazoli Bilandi | E02F 9/262 348/222.1 |
| 9,037,359 | B2 * | 5/2015 | Taylor | E02F 3/46 701/50 |
| 9,196,150 | B2 * | 11/2015 | Cs | G08B 21/22 |
| 9,248,998 | B2 * | 2/2016 | Maynard | B66C 15/04 |
| 9,415,976 | B2 * | 8/2016 | Hermann | B66C 15/045 |
| 9,460,051 | B2 * | 10/2016 | Horne | G06F 17/00 |
| 9,633,576 | B2 * | 4/2017 | Reed | B60K 28/10 |
| 10,075,681 | B2 * | 9/2018 | Ross | G11B 15/026 |
| 10,544,012 | B2 * | 1/2020 | Rudy | G06T 7/13 |
| 10,634,492 | B2 * | 4/2020 | Beery | H04N 7/18 |
| 10,717,631 | B2 * | 7/2020 | Rudy | B66C 15/06 |
| 10,896,327 | B1 * | 1/2021 | Lablans | G06V 10/25 |
| 11,024,137 | B2 * | 6/2021 | Phillips | G08B 13/19667 |
| 2004/0123328 | A1 * | 6/2004 | Coffey | G08B 13/19647 348/E7.086 |
| 2005/0007553 | A1 * | 1/2005 | Romanoff | F16M 11/18 352/243 |
| 2006/0098094 | A1 * | 5/2006 | Lott | B60R 1/00 348/148 |
| 2008/0155064 | A1 * | 6/2008 | Kosuge | G08B 21/20 709/219 |
| 2008/0180537 | A1 * | 7/2008 | Weinberg | H04N 23/56 348/E5.029 |
| 2009/0097840 | A1 * | 4/2009 | Amadril | F16M 11/18 396/428 |
| 2011/0226552 | A1 * | 9/2011 | Vos | F16B 5/0685 182/222 |
| 2012/0217091 | A1 * | 8/2012 | Baillargeon | G08B 21/02 182/18 |
| 2013/0319792 | A1 * | 12/2013 | Christian | B66F 11/04 182/69.6 |
| 2014/0267805 | A1 * | 9/2014 | Webb | H04N 23/54 348/208.2 |
| 2015/0217981 | A1 * | 8/2015 | Baillargeon | B66F 17/006 182/2.8 |
| 2016/0344905 | A1 * | 11/2016 | Duncan | G06F 3/0202 |
| 2016/0375876 | A1 * | 12/2016 | Silc | B60S 1/54 134/37 |
| 2017/0019588 | A1 * | 1/2017 | Gordon | F16M 11/42 |
| 2017/0038779 | A1 * | 2/2017 | Fujimori | B64C 39/024 |
| 2018/0241343 | A1 * | 8/2018 | Jiang | B25J 9/1679 |
| 2019/0028677 | A1 * | 1/2019 | Ross | H04N 5/76 |
| 2019/0215457 | A1 * | 7/2019 | Enke | H04N 23/66 |
| 2019/0312997 | A1 * | 10/2019 | Fujii | H04N 23/55 |
| 2019/0333378 | A1 * | 10/2019 | Iuzifovich | G08G 1/052 |
| 2020/0207599 | A1 * | 7/2020 | Bostock | F16M 11/18 |
| 2020/0317480 | A1 * | 10/2020 | Shankar | B66F 3/44 |
| 2022/0301425 | A1 * | 9/2022 | Stokeley | H04N 5/76 |

OTHER PUBLICATIONS

Movingongps.com [online], "MOSS-07DR Commercial Vehicle Camera," available on or before Apr. 17, 2017, retrieved Sep. 25, 2023, retrieved from URL <http://www.movinongps.com/truck-trailer-school-bus-tour-bus-cameras/moss-07dr-vehiclecamera>, 7 pages.

* cited by examiner

CAMERA SAFETY SYSTEM FOR AERIAL DEVICE

CROSS-REFERENCE TO RELATED APPLICATION

This application claims the benefit under 35 U.S.C. § 119(e) of U.S. Patent Application No. 62/649,005, entitled "Camera Safety System For Aerial Device," filed Mar. 28, 2018, which is incorporated herein by reference in its entirety.

TECHNICAL FIELD

The present invention relates to safety and monitoring systems utilized in applications having potential risk, such as a safety and monitoring system for use in monitoring operators in buckets of bucket trucks, and in particular, those working around power lines or other potentially dangerous environments.

BACKGROUND

Wireless feeds of audio or video from a camera through a transmitter to a receiver are available in various applications in the safety and monitoring industries. However, most camera systems receive power from an external source in a hardwired manner even if the video feed is sent wirelessly to a remote location. Without the power being supplied to the camera, the camera would not operate. The transmitter would have a similar problem. In the context of bucket trucks or other applications, in many instances an operator is placed in a potentially risky environment such as near high voltage wires or other high risk environments. Organizations seek to ensure the safety of the operator in such circumstances.

SUMMARY

It is an object of many of the embodiments of the present invention to provide an improved safety and monitoring system for use in potentially high voltage environments.

It is another object of many embodiments of the present invention to provide an improved safety and monitoring system for use with bucket trucks.

It is another object of many embodiments of the present invention to provide an improved safety and monitoring system for use with various equipment.

In some implementations, an aerial device data collection apparatus includes a power source, a data capture device, a wireless transmitter, and a housing. The data capture device is connected to the power source. The wireless transmitter is connected to the power source and is communicably coupled to the data capture device. The wireless transmitter is configured to transmit data captured by the data capture device. The power source and the wireless transmitter are contained within the housing. The housing is configured to couple to a surface of an aerial bucket.

These and other implementations may each optionally include one or more of the following features.

In some implementations, the data capture device is coupled to an upper surface of the housing.

In some instances, the power source includes one or more batteries.

In some implementations, the data capture device is configured to capture at least one of image data, video data, or audio data.

In some examples, the housing is waterproof.

In some cases, the apparatus includes a recording device. The recording device can be contained in the housing. In some examples, the recording device is communicably coupled to the data capture device and configured to record data captured by the data capture device. In some implementations, the apparatus includes a splitter device. In some examples, the splitter device is configured to provide data captured by the data capture device to the wireless transmitter, the recording device, or a combination thereof. In some implementations, the apparatus includes a Faraday cage. In some examples, the Faraday cage is contained within the housing and the recording device is located within the Faraday cage.

In another general aspect, a safety system for aerial devices includes a vehicle, an arm coupled to and extendable from a portion of the vehicle, an aerial bucket coupled to a distal portion of the arm, and a data collection device that is coupled to the aerial bucket and is electrically isolated from the vehicle and the arm. The data collection device includes a power source, a data capture device, a wireless transmitter, and a housing. The data capture device is connected to the power source. The wireless transmitter is connected to the power source and is communicably coupled to the data capture device. The wireless transmitter is configured to transmit data captured by the data capture device. The housing is coupled to the aerial bucket. The power source and the wireless transmitter are contained within the housing and the data capture device is coupled to the housing.

These and other implementations may each optionally include one or more of the following features.

In some implementations, the data capture device is coupled to an upper surface of the housing.

In some examples, the safety system includes a wireless receiver configured to receive information from the wireless transmitter. In some examples, the wireless receiver is located outside the aerial bucket. In some instances, the wireless receiver is located within a cab of the vehicle and is coupled to a power source of the vehicle In some instances, the power source includes one or more batteries.

In some implementations, the data capture device is configured to capture at least one of image data, video data, or audio data.

In some examples, the safety system includes a second data capture device. In some instances, the second data capture device is coupled to the aerial bucket and connected to the power source.

In some implementations, the safety system includes a recording device. In some examples, the recording device is contained within the housing and is communicably coupled to the data capture device. In some instances, the recording device is located within a cab of the vehicle and configured to record data captured by the data capture device.

In some implementations, the safety system includes a screen located within a cab of the vehicle and configured to display data captured by the data capture device.

Accordingly, in accordance with various embodiments of the present invention, a bucket truck, i.e., a vehicle having a boom with a bucket thereon for an operator to conduct elevated maintenance, is provided. The bucket is traditionally electrically isolated from the boom. The boom is also typically electrically isolated from the remainder of the vehicle. Providing at least one of an audio and video feed from the bucket or area around the bucket has traditionally been difficult, if not impossible, because a camera would need power in order to take video. A power cable to a camera at the bucket connected to a battery or generator of the vehicle would prevent the ability of the bucket truck to pass certification, given that the presence of such a power cable would entail an electrical conductor extending from the bucket down through the boom to other portions of the vehicle. A wired video feed would have similar trouble.

While cameras exist in the marketplace, possibly in combination with wireless. transmitters to transmit audio or video feeds to remote receivers, the current set of cameras utilized receive power from the vehicle in a wired manner as do the transmitters.

Various embodiments provide for at least one camera directed towards an operator in a bucket of a bucket truck, such as connected to the bucket itself, with a transmitter and a battery receiver disposed within a housing connected to the bucket. In fact, the camera may, for some embodiments, be connected to an external surface of the housing at an elevation near the upper lip of the bucket itself.

The camera can be powered by a rechargeable battery connected to the battery receiver within the housing. In some examples, the battery receiver can be somewhat similar to many cordless tools that receive a cordless tool battery such as a Dewalt or a Milwaukee brand 18-volt battery or other brand (or other type of rechargeable battery). The batteries can have a capacity of about 5-6 amp hours. In some implementations, the battery can have a capacity of 9 amp hours or more. Embodiments can also use other suitable types of batteries and battery receivers. Utilizing a battery, embodiments can provide for not only camera operation for roughly 30-40 hours with a 6-amp hour battery, but also transmitter operation as well to be able to provide a signal wirelessly to a receiver in the cab within the vehicle to be recorded locally or remotely.

Still other embodiments may include a splitter or may provide a simultaneous video and audio feed to another location such as to a digital video recorder (DVR) or other type of data recording device at the bucket such as in the housing, possibly with a Faraday cage so as to potentially protect the recording device from damage in the event of a large electrical event.

Still other improvements may exist with various other embodiments as well.

BRIEF DESCRIPTION OF DRAWINGS

The accompanying drawings illustrate embodiments of the invention and, together with the description, serve to explain the embodiments. These drawings are offered by way of illustration and not by way of limitation.

DETAILED DESCRIPTION

Figure 1:
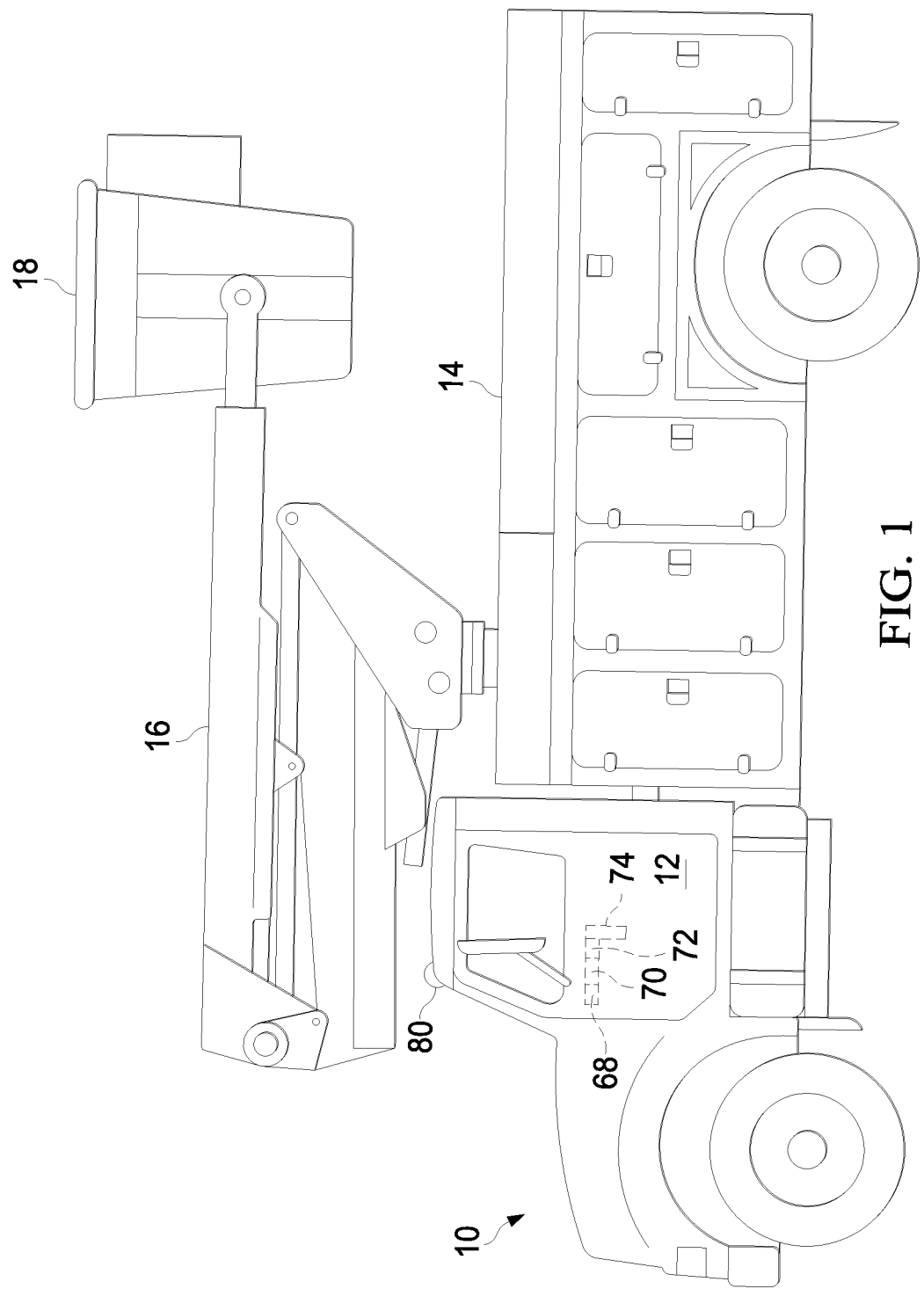
FIG. 1 is a side plan view of a bucket truck, according to embodiments.

FIG. 1 shows a vehicle 10 in the form of bucket truck. Bucket truck 10 has a chassis 12 connected to a utility body 14 having a boom 16 connected to a bucket 18. The bucket 18 is electrically isolated from the boom 16. The boom 16 is electrically isolated from the body 14. A flash of electricity at the bucket 18 should not transmit through the body 14 or even the boom 16. However, recording such an event would be advantageous to hopefully prevent similar activity in the future by allowing persons to review the event and provide coaching to other users on lessons learned, prevention methods, safety standards, etc.

Figure 2:
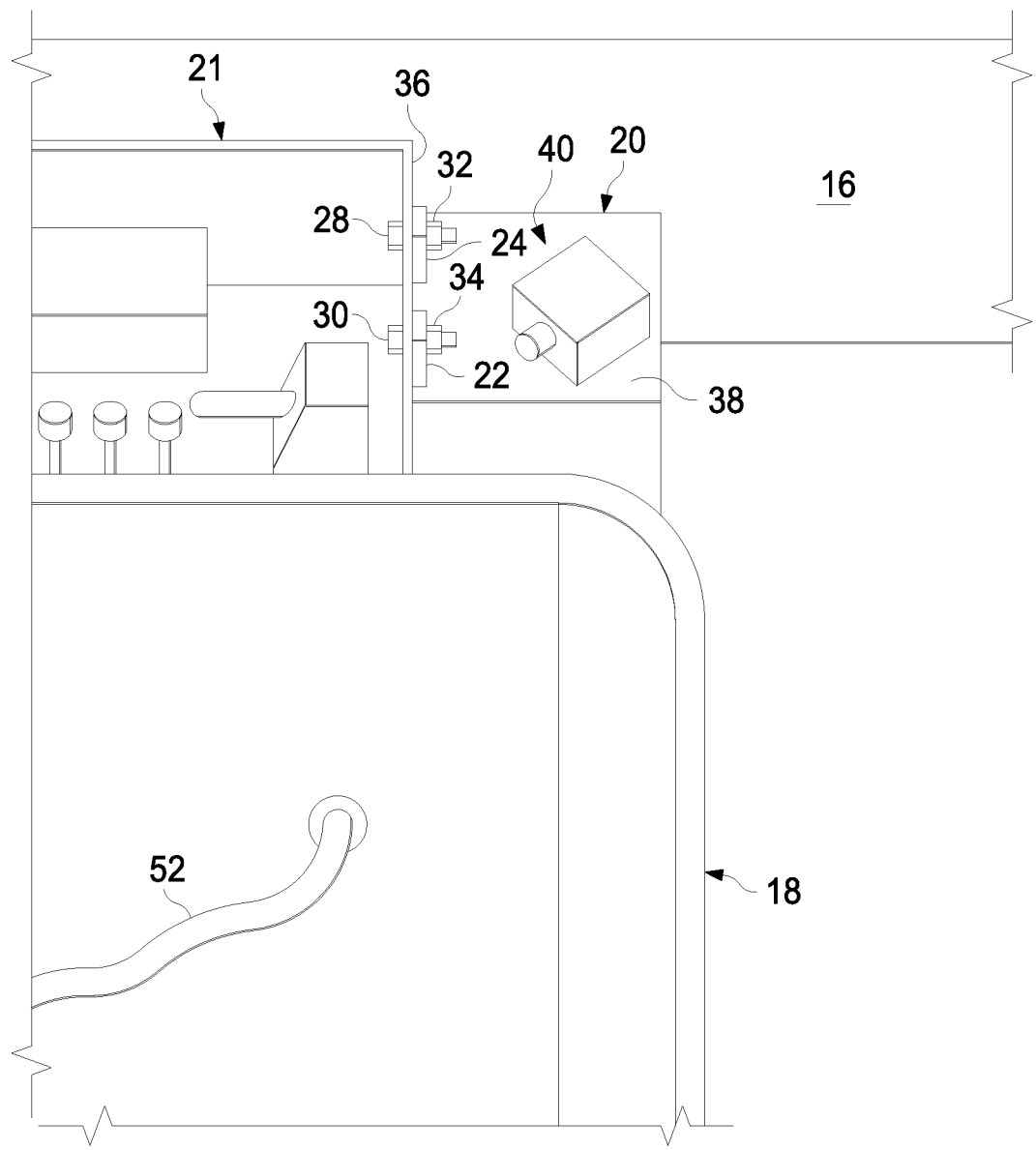
FIG. 2 is a top perspective view of a portion of the bucket shown in FIG. 1.

FIG. 2 shows an image of the bucket 18 having a housing 20 connected thereto (on an exterior or other surface such as on an exterior surface of control portion 21) such as with flanges 22, 24 bolted with bolts 28, 30 as well as possibly nuts 32, 34 to the bucket wall 36. Additional connectors other than bolts 28, 30 may be utilized to connect the housing 20 to the bucket 18 loaded to a bucket wall 36 or other portion of the bucket 18. In some implementations, the housing 20 is configured to be attached to a surface of the bucket 18. For example, the shape of the housing 20 can be configured such that a portion of the housing 20 couples to a portion of the bucket wall 36. In some implementations, the housing 20 is configured to attach to a surface of the bucket 18 such that an upper surface 38 of the housing 20 is at approximately the same elevation as the lip 42 of the bucket 18, as depicted in FIG. 2.

A data capture device 40 is coupled to the housing 20. In the depicted example, the data capture device 40 is coupled to an upper surface 38 of the housing 20 and directed at the bucket 18. In some embodiments, the data capture device 40 is located above the lip of the bucket 18.

Figure 3:
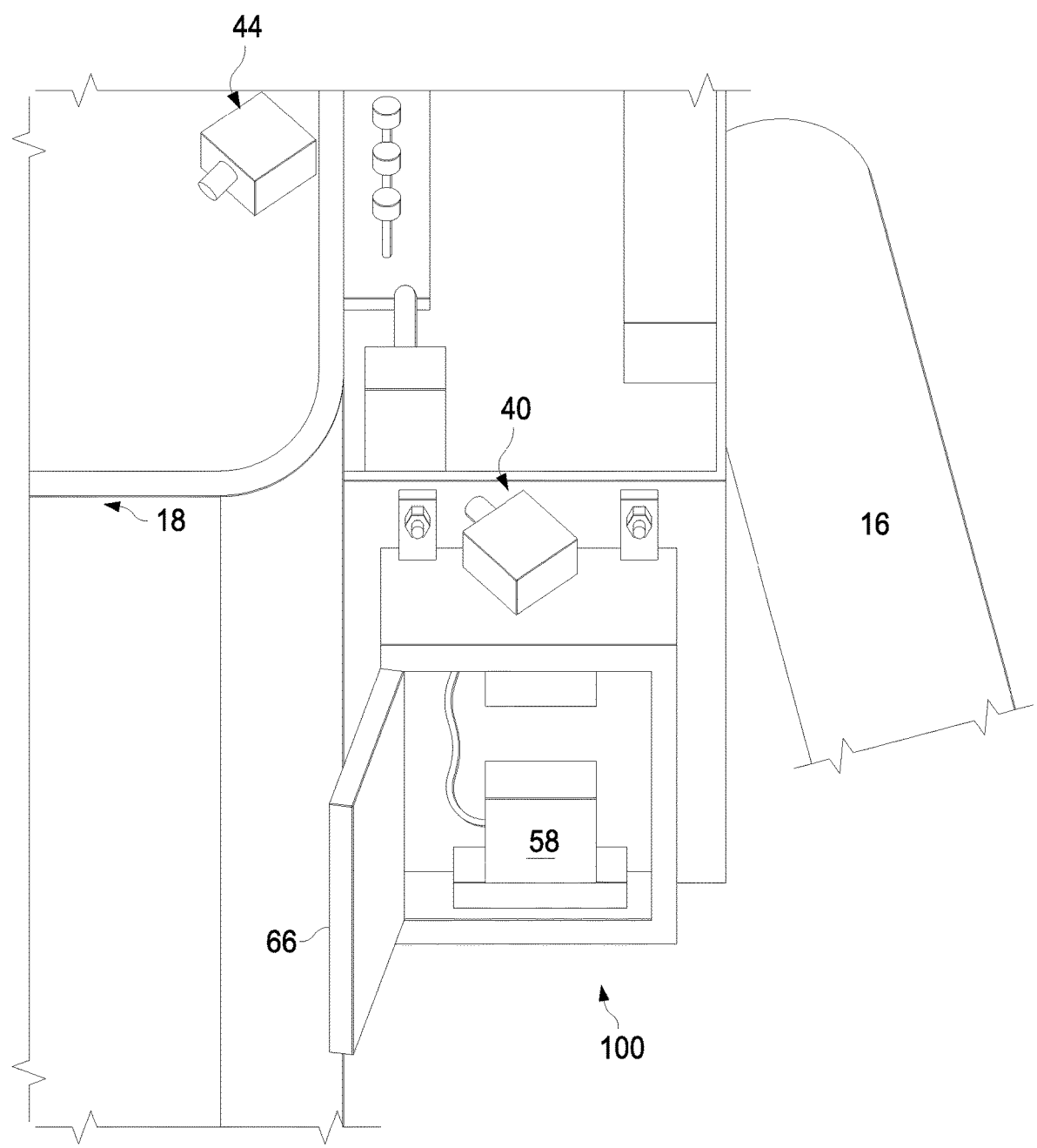
FIG. 3 is a top perspective view of a portion of the bucket shown in FIG. 2 from an opposite orientation.
Figure 4:
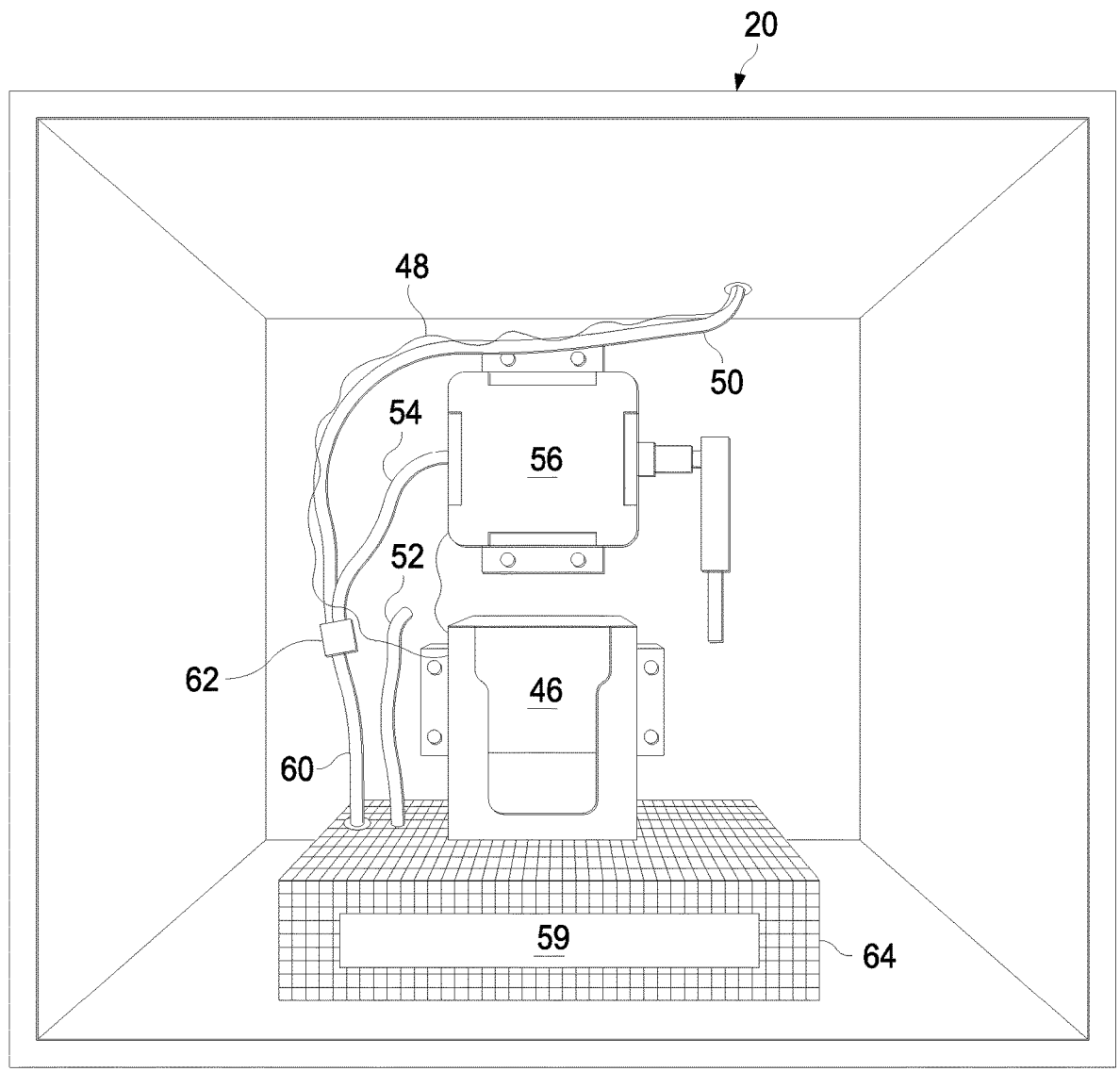
FIG. 4 is a rear plan view of internals to the housing shown in FIG. 3.

As depicted in FIG. 3, a second data capture device 44 may be located within the bucket 18. In some embodiments, multiple data capture devices 40, 44 are utilized to capture various angles of the bucket 18. Regardless of the number of data capture devices 40, 44, the data capture devices 40, 44 are preferably electrically isolated relative to the boom 16 and body 14. This means there is no power connection traveling through the boom 16 to the data capture devices 40, 44 or video wiring traveling through the boom 16 from the data capture devices 40, 44. In some implementations, as shown in FIGS. 3 and 4, the data capture devices 40, 44 receive power from a battery 58 connected to a battery connection 46, which provides power through wires 48, 50 to data capture devices 40, 44. In some examples, video feed is provided from data capture devices 40, 44 through various video wires such a 52, 54 to transmitter 56, which transmits a wireless video, image, or audio signal, as will be described in further detail below.

Data capture devices 40, 44 can include any device suitable for capturing image data, video data, audio data, or a combination thereof. In some implementations, the data capture devices 40, 44 include one or more cameras capable of capturing images. In some implementations, the data capture devices 40, 44 include one or more video recording devices capable of capturing video data and audio data. In some examples, the data capture devices 40, 44 include one or more sound recording devices configured to capture audio data. In some implementations, the data capture devices 40, 44 are arranged to visualize the inside of the bucket 18 and any operators within the bucket 18.

Battery connector 46 as shown in FIG. 4 can receive a rechargeable battery 58 therein such as one that is provided by means such as Dewalt, Milwaukee, or suitable others which could be an 18 volt or other appropriate voltage. In the illustrated embodiment, a battery 58 with the capacity of roughly 5 amp hours is provided. In some implementations, the battery 58 has a capacity of 9 amp hours. The voltage and capacity of the battery 58 can be any suitable voltage and capacity for supplying power to the data capture devices 40, 44. In some examples, the rechargeable battery 58 can supply data capture device 40 and the transmitter 56 for with power for 25 to 32 hours without needing to be recharged.

Inclusion of a second data capture device 44 may reduce the life of battery 58. In some examples, larger capacity batteries 58 or multiple batteries 58 are utilized to provide a prolonged battery life between charges.

In some implementations, a recorder 59 may be provided in the housing. In some examples, the recorder 59 is internal to a Faraday cage 64 in an effort to protect the recorder 59 in the event of an adverse electrical event such as a high voltage spike or other event. An MR420 from 3rd Eye or other unit could be utilized. In some examples, recorder 59 is designed to withstand an electromagnetic pulse (EMP) burst.

In some embodiments, as depicted in FIG. 3, the housing 20 has a door 66 with the internal portions thereby providing a cabinet about the transmitter 56, the battery 58, the battery connector 46, and the recorder 59. In some examples, additional transmitters 56, additional battery connectors 46, and additional batteries 58 are provided to cooperate with multiple data capture devices 40, 44 and provide additional power, with the various data capture devices 40, 44 being separately powered or powered through multiple batteries 58. In some implementations, a splitter device 62 provides data captured by the one or data capture devices 40, 44 to the transmitter 56, the recorder 59, or a combination thereof through the splitter's 62 connection to a plurality of wires 48, 50, 54, 60.

In some embodiments, housing 20 provides a waterproof (or at least substantially waterproof) cabinet about the battery 58, the battery connector 46, and the transmitter 56. In some examples, the housing 20 also encloses the recorder 59.

When the battery 58 is nearing end of life, it can be removed from the battery connector 46, and replaced or recharged with a battery charger. In some examples, the vehicle 10 has the capability of providing 110 AC or an appropriate DC voltage to a charger for recharging the battery 58. As depicted in the system 100 of FIGS. 1-4, there is no conductor connecting any of the safety system with the boom 16, the chassis 12, or the vehicle body 14.

In some examples, data transmitted by the transmitter 56 is received by a receiver 68 (such as an AWT96WR or other receiver) located in the chassis 12. In some examples, the receiver 68 is connected to at least one of a second recorder 70 such as an MR420 or a second transmitter 72. In some implementations, the second transmitter 72 transmits the signal received by the receiver 68 remotely for local or remote storage, such as to a cloud based storage or storage with a 3ECUDU3 AWT07 MLED75D7, AWT84MSD or other appropriate device. In some examples, the second recorder 70 includes memory, such SD card memory, or other memory. In some implementations, the second recorder 70 functions as a "black box" system.

In some embodiments, data capture devices 40, 44 are provided as AWT1020T cameras and transmitter 56 is provided as one or more AWTWSV01 wireless modules. In some examples, the housing 20 is a Hoffman NEMA4 enclosure A 1086CHSCFG. In some implementations, batteries 58 include multiple 48-11-1850 Milwaukee 5.0 M18 batteries. In some examples, a 48-59-1812M18 battery charger is used to recharged batteries 58. Other battery charging systems, such as inductive, solar, or other systems, can be utilized to recharge batteries 58. A 5 Ah battery was found to have a capacity of 25-32 hours in testing. A 9 Ah battery, would have roughly a 40-50 hour capacity in the same testing environment.

In some implementations, the transmitter 56 can send 2.4 gigahertz rated at RF signals with a range of approximately 200-500 feet. In some embodiments, transmitter 56 may transit 500-600 foot unobstructed or 300 obstructed. Other embodiments may provide other ranges. Therefore, depending on the length of the boom 16, the signal provided by the transmitter 56 can be received by the receiver 68 internal to the chassis 12 with no conductor connecting the transmitter 56 and the receiver 68. The absence of a conductor is important because even hydraulic fluid to a bucket 18 is dielectric so that if a bucket 18 hits a live power line, electricity will not travel back down to the chassis 12 or other portion of the vehicle 10 through various conductive lines. The boom 16 as illustrated can have at least two insulating sections to prevent electricity traveling down to the ground.

In some embodiments, an NTSC Analog signal is sent from the transmitter 56 to the receiver 68. In some examples, the transmitter 56 can send other analog or digital data received from the data capture devices 40, 44.

In some embodiments, the recorder 70 is an under dash unit (UDU) as described in U.S. Pat. No. 9,633,576, titled "Vehicle Activity Information System," the entirety of which is hereby incorporated by reference into the present disclose. The recorder 70 can also be any other suitable recorder. The UDU when utilized as a recorder 70 may have the ability to record a relatively large number of data capture device or other inputs.

In some implementations, one or more data capture devices 80 located outside of the bucket 18, such as on the top of the chassis 12, are directed at the bucket 18. In some implementations, remote data capture devices that are not connected to the vehicle 10 can be directed at the bucket 18.

Data capture device 80 can include any device suitable for capturing image data, video data, audio data, or a combination thereof. In some implementations, the data capture device 80 includes one or more cameras capable of capturing images. In some implementations, the data capture device 80 includes one or more video recording devices capable of capturing video data and audio data. In some examples, the data capture device 80 includes one or more sound recording devices configured to capture audio data. In some implementations, the data capture device 80 is arranged to visualize the inside of the bucket 18 and any operators within the bucket 18.

A display, such as display 74, can be utilized so that someone in the chassis 12 could be watching the operator in the bucket 18 based on the data captured by the data capture devices 40, 44 and transmitted by the transmitter 56. In some implementations, the display 74 is an LED screen. In some examples, the display is a 7-inch LED screen. The signals received from the transmitter 56 can also be stored on an SD card at the recorder 70. In some implementations, the signals received by the receiver 68 from the transmitter 56 are sent wirelessly to the cloud such as through a 3G connection or with transmitter 72 to various servers.

Various types of data capture devices 40, 44 may be utilized, such as "vandal proof" dome style or other suitable types of cameras. In some instances, a data capture device 80 with a relatively long focal length could be attached to the top of the chassis 12 to point at the bucket 18 when the bucket 18 is in use. In some implementations, the data capture devices 40, 44, 80 automatically track movement of the bucket 18. In some examples, the data capture devices 40, 44, 80 are positioned manually. In some implementations, the data capture devices 40, 44, 80 are positioned using wireless controls.

In addition to audio and video signals, in some implementations, additional signals can be provided to the recorder 70, such as from the J1939 system or the J1939 system, to coordinate the automatic recording of images from various data capture devices 40, 44, 80. In some embodiments, the data capture devices 40, 44, 80 can be positioned based on data input received by the recorder. In some examples, the positions of stabilizer legs, whether they are up or down or being extended, can be evaluated to determine when to start recording via data capture devices 40, 44, 80. In some examples, signals from the power take-off (PTO) can be evaluated to determine when to start recording via data capture devices 40, 44, 80. In some examples, normal chassis signals (such as the position of the transmission) can be evaluated and utilized to start the recording process. For instance, a signal of when the bucket 18 leaves an at-rest position (as depicted in FIG. 1) could initiate a signal to start the recording process, and the bucket 18 returning to the at-rest position could result in a signal to turn off the data capture device(s) 40, 44, 80. The remote data capture device might follow the movement of the bucket 18 based on signals received by the remote data capture device. Other signals could be obtained from smart cylinders, boom position or other sensed activities.

In some implementations, signals indicating operator presence (determined using a weight sensor) can be evaluated. In some examples, an inductive electrical sensor can be utilized to evaluate whether there is an electrical voltage near the bucket 18. In some implementations, other data can be evaluated by receiver 68 or other processors. In some examples, weight sensors, rain sensor(s), heartbeat indicators, or other sensors can be located within the bucket 18 and utilized with to determine conditions within the bucket 18. In some examples, visual plum indicators, inclinometers or other devices provide signals to the recorder 70 to be sent through the transmitter 72 wirelessly to the cloud or other storage locations. Additionally, the recorder 70 may have local storage, such as SD cards or other local storage.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A safety system for aerial devices comprising:
a vehicle;
an arm coupled to and extendable from a portion of the vehicle;
an aerial bucket coupled to a distal portion of the arm; and
a data collection device that is coupled to the aerial bucket and electrically isolated from the vehicle and the arm, the data collection device comprising:
a power source;
at least one data capture device connected to and configured to receive power from the power source, the at least one data capture device including a camera;
a wireless transmitter connected to the power source, wherein the wireless transmitter is communicably coupled to the at least one data capture device and configured to transmit data captured by the at least one data capture device; and
a housing coupled to the aerial bucket, wherein the power source and the wireless transmitter are contained within the housing and the data capture device is coupled to the housing, wherein the at least one data capture device is coupled to a surface of the housing and arranged to capture data that includes video data of an operator inside the aerial bucket, and the data capture device is controlled to capture data based on signals indicating at least one of a status of a power take-off (PTO) of the vehicle, a position of a transmission of the vehicle, a position of the aerial bucket, or a position of the arm.

2. The safety system of claim 1, wherein a surface of the at least one data capture device is coupled to an external surface of the housing.

3. The safety system of claim 2, wherein the surface of the at least one data capture device is coupled to an upper external surface of the housing.

4. The safety system of claim 1, further comprising a wireless receiver configured to receive information from the wireless transmitter, wherein the wireless receiver is located outside the aerial bucket.

5. The safety system of claim 4, wherein the wireless receiver is located within a cab of the vehicle and is coupled to a power source of the vehicle.

6. The safety system of claim 1, wherein the power source comprises one or more batteries.

7. The safety system of claim 1, wherein the at least one data capture device is configured to capture at least one of image data or audio data.

8. The safety system of claim 1, further comprising a second data capture device.

9. The safety system of claim 8, wherein the second data capture device is coupled to the aerial bucket and connected to the power source.

10. The safety system of claim 1, further comprising a recording device.

11. The safety system of claim 10, wherein the recording device is contained within the housing and is communicably coupled to the at least one data capture device.

12. The safety system of claim 10, wherein the recording device is located within a cab of the vehicle and configured to record data captured by the at least one data capture device.

13. The safety system of claim 10, further comprising a splitter device, wherein the splitter device is configured to provide data captured by the at least one data capture device to the wireless transmitter, the recording device, or a combination thereof.

14. The safety system of claim 10, further comprising a Faraday cage, wherein the Faraday cage is contained within the housing and the recording device is located within the Faraday cage.

15. The safety system of claim 1, further comprising a screen located within a cab of the vehicle and configured to display data captured by the at least one data capture device.

16. The safety system of claim 1, wherein the housing is waterproof.

17. The safety system of claim 1, wherein the housing comprises a door.

\* \* \* \* \*